(12) United States Patent
Ainscow et al.

(10) Patent No.: US 10,691,357 B2
(45) Date of Patent: Jun. 23, 2020

(54) CONSIDERATION OF CONFIGURATION-BASED INPUT/OUTPUT PREDICTIONS IN MULTI-TIERED DATA STORAGE SYSTEM MANAGEMENT

(71) Applicant: International Business Machines Corporation, Armonk, NY (US)

(72) Inventors: Alexander H. Ainscow, Winchester (GB); John M. Clifton, Hertfordshire (GB); Sarvesh S. Patel, Pune (IN); Kushal S. Patel, Pune (IN); Kalpesh Chhajed, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/058,816

(22) Filed: Aug. 8, 2018

(65) Prior Publication Data
US 2020/0050381 A1 Feb. 13, 2020

(51) Int. Cl.
G06F 3/06 (2006.01)

(52) U.S. Cl.
CPC .......... G06F 3/0632 (2013.01); G06F 3/0604 (2013.01); G06F 3/067 (2013.01); G06F 3/0616 (2013.01); G06F 3/0649 (2013.01); G06F 3/0662 (2013.01)

(58) Field of Classification Search
CPC .... G06F 3/0604; G06F 3/0632; G06F 3/0616; G06F 3/0649; G06F 3/0662; G06F 3/067
USPC ................................................ 711/165, 170
See application file for complete search history.

(56) References Cited

U.S. PATENT DOCUMENTS

| | | |
|---|---|---|
| 6,237,021 B1 | 5/2001 | Drummond |
| 8,868,797 B1 | 10/2014 | Kirac et al. |
| 8,935,493 B1 | 1/2015 | Dolan et al. |
| 8,972,694 B1 | 3/2015 | Dolan et al. |

(Continued)

FOREIGN PATENT DOCUMENTS

IN 310MUM2015 A 8/2016

OTHER PUBLICATIONS

SRI International, "Artificial Intelligence: CALO," 2003, 1 page, retrieved from https://www.sri.com/work/timeline-innovation/timeline.php?timeline=computing-digital#!&innovation=artificial-intelligence-calo.

(Continued)

*Primary Examiner* — Pierre Miche Bataille
(74) *Attorney, Agent, or Firm* — Zilka-Kotab, P.C.

(57) ABSTRACT

A computer-implemented method, according to one embodiment, includes: detecting that a configuration change for a virtualization layer in a multi-tiered data storage system has been received, and determining whether the configuration change corresponds to a tiering adjustment. In response to determining that the configuration change corresponds to a tiering adjustment, I/O pattern changes are predicted. Moreover, a determination is made as to whether each specific extent is stored in a tier of the multi-tiered data storage system suitable to satisfy the predicted I/O pattern changes which correspond to the respective specific extent. In response to determining that one of the specific extents is stored in a tier of the multi-tiered data storage system which is not suitable to satisfy the predicted I/O pattern changes, the at least one specific extent is migrated to another one of the tiers determined as being suitable to satisfy the predicted I/O pattern changes.

19 Claims, 9 Drawing Sheets

(56) References Cited

U.S. PATENT DOCUMENTS

| | | | |
|---|---|---|---|
| 9,015,412 B2* | 4/2015 | Miwa | G06F 3/061 |
| | | | 711/114 |
| 9,047,017 B1 | 6/2015 | Dolan et al. | |
| 9,244,616 B2* | 1/2016 | Miwa | G06F 3/061 |
| 9,244,858 B1 | 1/2016 | Hu | |
| 10,353,616 B1* | 7/2019 | Tao | G06F 3/0649 |
| 2011/0314069 A1* | 12/2011 | Alatorre | G06F 16/122 |
| | | | 707/827 |
| 2013/0145092 A1* | 6/2013 | Miwa | G06F 3/061 |
| | | | 711/114 |
| 2013/0312005 A1 | 11/2013 | Chiu et al. | |
| 2015/0193148 A1* | 7/2015 | Miwa | G06F 3/061 |
| | | | 711/114 |
| 2015/0355837 A1* | 12/2015 | Bish | G06F 3/061 |
| | | | 711/114 |
| 2016/0048355 A1* | 2/2016 | Iliadis | G06F 3/0607 |
| | | | 711/171 |
| 2016/0328176 A1 | 11/2016 | Chiu et al. | |
| 2017/0147237 A1 | 5/2017 | Fang et al. | |
| 2017/0262216 A1* | 9/2017 | Polkovnikov | G06F 3/0611 |
| 2017/0373935 A1* | 12/2017 | Subramanian | H04L 41/0816 |
| 2019/0188058 A1* | 6/2019 | Martin | G06F 9/542 |

OTHER PUBLICATIONS

Naone, E., "Intelligent Machines Software That Learns from Users," MIT Technology Review, Nov. 30, 2007, 6 pages, retrieved from https://www.technologyreview.com/s/409120/software-that-learns-from-users/.

Wikipedia, "CALO," Wikipedia, Jul. 2018, 6 pages, retrieved from https://en.wikipedia.org/wiki/CALO.

\* cited by examiner

CONSIDERATION OF CONFIGURATION-BASED INPUT/OUTPUT PREDICTIONS IN MULTI-TIERED DATA STORAGE SYSTEM MANAGEMENT

BACKGROUND

The present invention relates to data storage, and more specifically, this invention relates to using predicted input/output (I/O) patterns to manage the storage of data.

The cost per unit (e.g., Gigabyte) of storage is typically higher for higher performance (e.g., faster data access times) memory than it is for relatively lower performance memory. Thus, tiers of memory having different performance characteristics may be grouped together to form multi-tiered data storage. Thus, data may be selectively stored on different ones of the available tiers depending on criteria of the access, frequency of use, security and data recovery requirements, etc. For example, data that is frequently accessed by an application that is response time sensitive may be stored in a tier which has relatively fast data access times, e.g., such as solid state drives (SSD). However, other data that is infrequently accessed and for which a higher response time is more tolerable may be stored in a high capacity hard disk drive (HDD) which has relatively slower data access times compared to SSDs.

The capacity of a higher performance data storage tier is typically smaller than the capacity of a lower data storage tier in view of their relative prices. In order to maintain an efficient use of the higher performing, yet typically smaller, data storage tier, algorithms may be implemented to relocate data based on a temperature associated therewith. For example, "hotter" data may be migrated towards the higher storage tier (e.g., promoted), while "colder" data is migrated towards the slower tier (e.g., demoted). In the present context, the heat (e.g., "hotter" and "colder") of data refers to the rate (e.g., frequency) at which the data is updated. Memory blocks that are considered "hot" or "hotter" tend to have a frequent update rate, while memory blocks that are considered "cold" or "colder" have an update rate which is at least slower than that of hot blocks. Additional factors may be incorporated into the determination of the relative heat of a given portion of data, e.g., such as read frequency. It follows that this promotion and demotion process of data actually relocates the data from one tier to another, and may even be performed without the knowledge of an application that is running.

SUMMARY

A computer-implemented method, according to one embodiment, includes: detecting that a configuration change for a virtualization layer in a multi-tiered data storage system has been received, and determining whether the configuration change corresponds to a tiering adjustment. In response to determining that the configuration change corresponds to a tiering adjustment, input/output (I/O) pattern changes which will result from the configuration change are predicted. Moreover, for each specific extent corresponding to the predicted I/O pattern changes, a determination is made as to whether the specific extent is stored in a tier of the multi-tiered data storage system that is suitable to satisfy the predicted I/O pattern changes which correspond to the respective specific extent. In response to determining that at least one of the specific extents is stored in a tier of the multi-tiered data storage system which is not suitable to satisfy the predicted I/O pattern changes which correspond to the at least one specific extent, the at least one specific extent is migrated to another one of the tiers in the multi-tiered data storage system determined as being suitable to satisfy the predicted I/O pattern changes.

A computer program product, according to another embodiment, includes a computer readable storage medium having program instructions embodied therewith. The computer readable storage medium is not a transitory signal per se. Moreover, the program instructions readable and/or executable by a processor to cause the processor to perform a method which includes: detecting, by the processor, that a configuration change for a virtualization layer in a multi-tiered data storage system has been received; and determining, by the processor, whether the configuration change corresponds to a tiering adjustment. In response to determining that the configuration change corresponds to a tiering adjustment, input/output (I/O) pattern changes which will result from the configuration change are predicted by the processor. Moreover, for each specific extent corresponding to the predicted I/O pattern changes, a determination is made by the processor as to whether the specific extent is stored in a tier of the multi-tiered data storage system that is suitable to satisfy the predicted I/O pattern changes which correspond to the respective specific extent. In response to determining that at least one of the specific extents is stored in a tier of the multi-tiered data storage system which is not suitable to satisfy the predicted I/O pattern changes which correspond to the at least one specific extent, the at least one specific extent is migrated, by the processor, to another one of the tiers in the multi-tiered data storage system determined as being suitable to satisfy the predicted I/O pattern changes.

A system, according to yet another embodiment, includes: a processor; and logic integrated with the processor, executable by the processor, or integrated with and executable by the processor. The logic being configured to: detect, by the processor, that a configuration change for a virtualization layer in a multi-tiered data storage system has been received; and determine, by the processor, whether the configuration change corresponds to a tiering adjustment. In response to determining that the configuration change corresponds to a tiering adjustment, input/output (I/O) pattern changes which will result from the configuration change are predicted by the processor. Moreover, for each specific extent corresponding to the predicted I/O pattern changes, a determination is made by the processor as to whether the specific extent is stored in a tier of the multi-tiered data storage system that is suitable to satisfy the predicted I/O pattern changes which correspond to the respective specific extent. In response to determining that at least one of the specific extents is stored in a tier of the multi-tiered data storage system which is not suitable to satisfy the predicted I/O pattern changes which correspond to the at least one specific extent, the at least one specific extent is migrated, by the processor, to another one of the tiers in the multi-tiered data storage system determined as being suitable to satisfy the predicted I/O pattern changes.

Other aspects and embodiments of the present invention will become apparent from the following detailed description, which, when taken in conjunction with the drawings, illustrate by way of example the principles of the invention.

DETAILED DESCRIPTION

Figure 1:
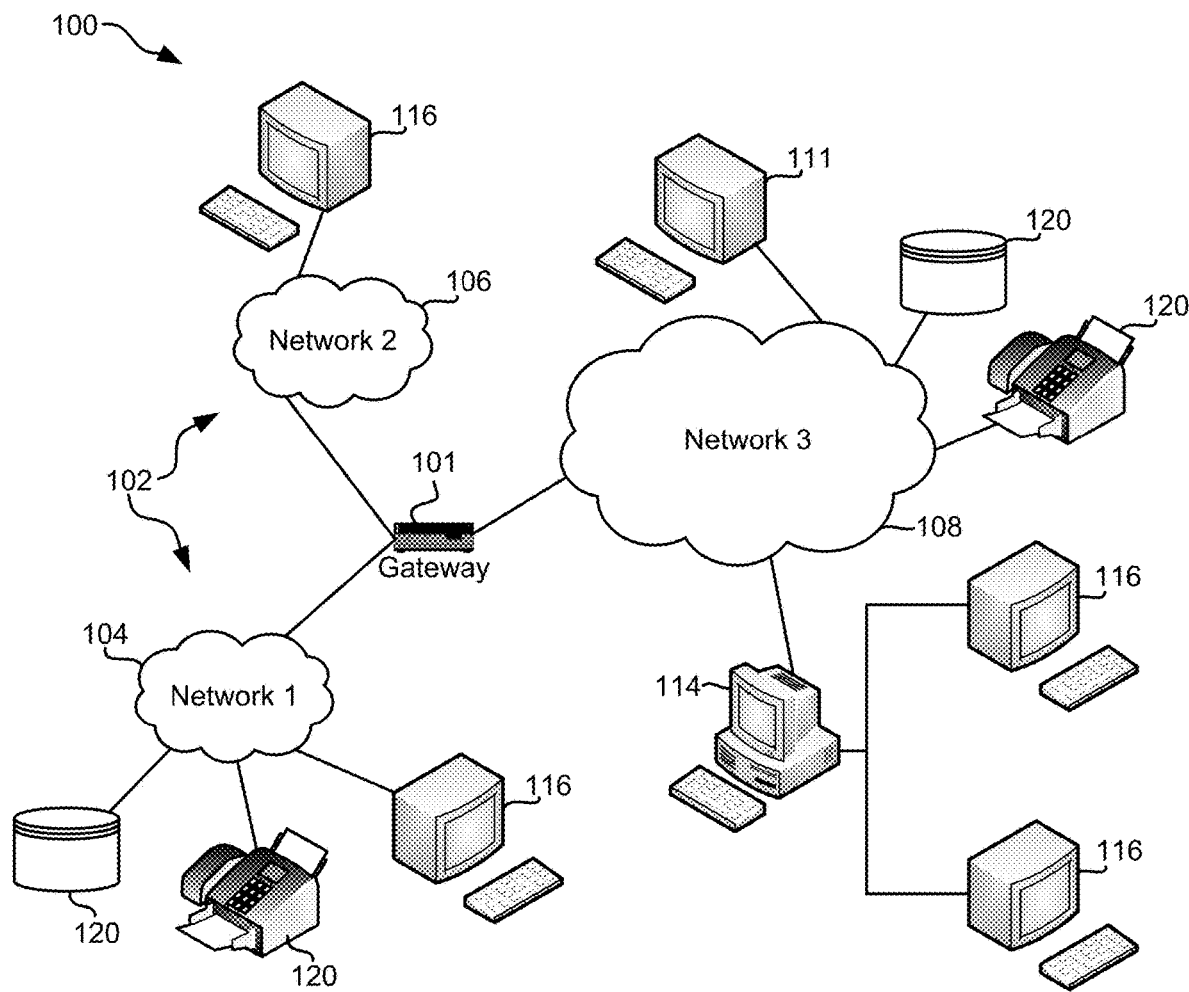
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for predicting I/O pattern shifts caused by configuration changes. Moreover, these predictions are utilized in some embodiments to avoid any detrimental effects to the storage devices used to satisfy these predicted I/O pattern shifts, e.g., as will be described in further detail below.

In one general embodiment, a computer-implemented method includes: detecting that a configuration change for a virtualization layer in a multi-tiered data storage system has been received, and determining whether the configuration change corresponds to a tiering adjustment. In response to determining that the configuration change corresponds to a tiering adjustment, input/output (I/O) pattern changes which will result from the configuration change are predicted. Moreover, for each specific extent corresponding to the predicted I/O pattern changes, a determination is made as to whether the specific extent is stored in a tier of the multi-tiered data storage system that is suitable to satisfy the predicted I/O pattern changes which correspond to the respective specific extent. In response to determining that at least one of the specific extents is stored in a tier of the multi-tiered data storage system which is not suitable to satisfy the predicted I/O pattern changes which correspond to the at least one specific extent, the at least one specific extent is migrated to another one of the tiers in the multi-tiered data storage system determined as being suitable to satisfy the predicted I/O pattern changes.

In another general embodiment, a computer program product includes a computer readable storage medium having program instructions embodied therewith. The computer readable storage medium is not a transitory signal per se. Moreover, the program instructions readable and/or executable by a processor to cause the processor to perform a method which includes: detecting, by the processor, that a configuration change for a virtualization layer in a multi-tiered data storage system has been received; and determining, by the processor, whether the configuration change corresponds to a tiering adjustment. In response to determining that the configuration change corresponds to a tiering adjustment, input/output (I/O) pattern changes which will result from the configuration change are predicted by the processor. Moreover, for each specific extent corresponding to the predicted I/O pattern changes, a determination is made by the processor as to whether the specific extent is stored in a tier of the multi-tiered data storage system that is suitable to satisfy the predicted I/O pattern changes which correspond to the respective specific extent. In response to determining that at least one of the specific extents is stored in a tier of the multi-tiered data storage system which is not suitable to satisfy the predicted I/O pattern changes which correspond to the at least one specific extent, the at least one specific extent is migrated, by the processor, to another one of the tiers in the multi-tiered data storage system determined as being suitable to satisfy the predicted I/O pattern changes.

In yet another general embodiment, a system includes: a processor; and logic integrated with the processor, executable by the processor, or integrated with and executable by the processor. The logic being configured to: detect, by the processor, that a configuration change for a virtualization layer in a multi-tiered data storage system has been received; and determine, by the processor, whether the configuration change corresponds to a tiering adjustment. In response to determining that the configuration change corresponds to a tiering adjustment, input/output (I/O) pattern changes which will result from the configuration change are predicted by the processor. Moreover, for each specific extent corresponding to the predicted I/O pattern changes, a determination is made by the processor as to whether the specific extent is stored in a tier of the multi-tiered data storage system that is suitable to satisfy the predicted I/O pattern changes which correspond to the respective specific extent. In response to determining that at least one of the specific extents is stored in a tier of the multi-tiered data storage system which is not suitable to satisfy the predicted I/O pattern changes which correspond to the at least one specific extent, the at least one specific extent is migrated, by the processor, to another one of the tiers in the multi-tiered data storage system determined as being suitable to satisfy the predicted I/O pattern changes.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
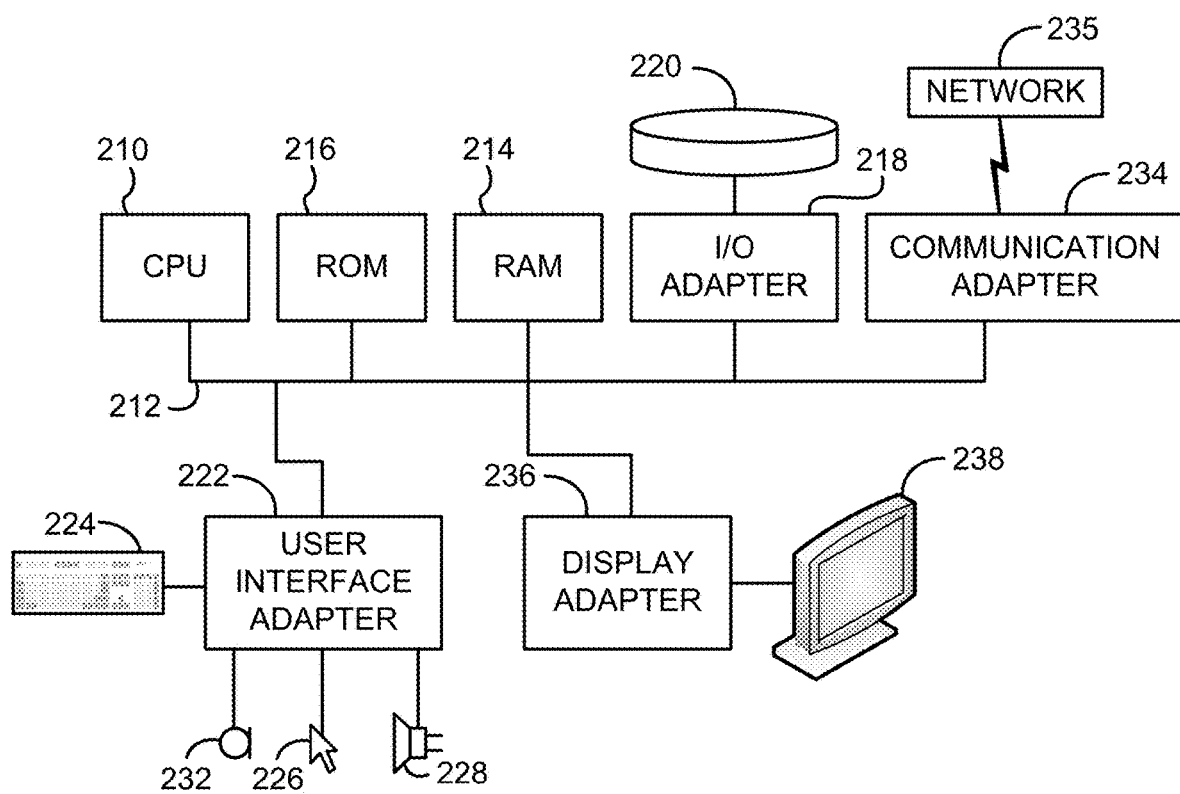
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
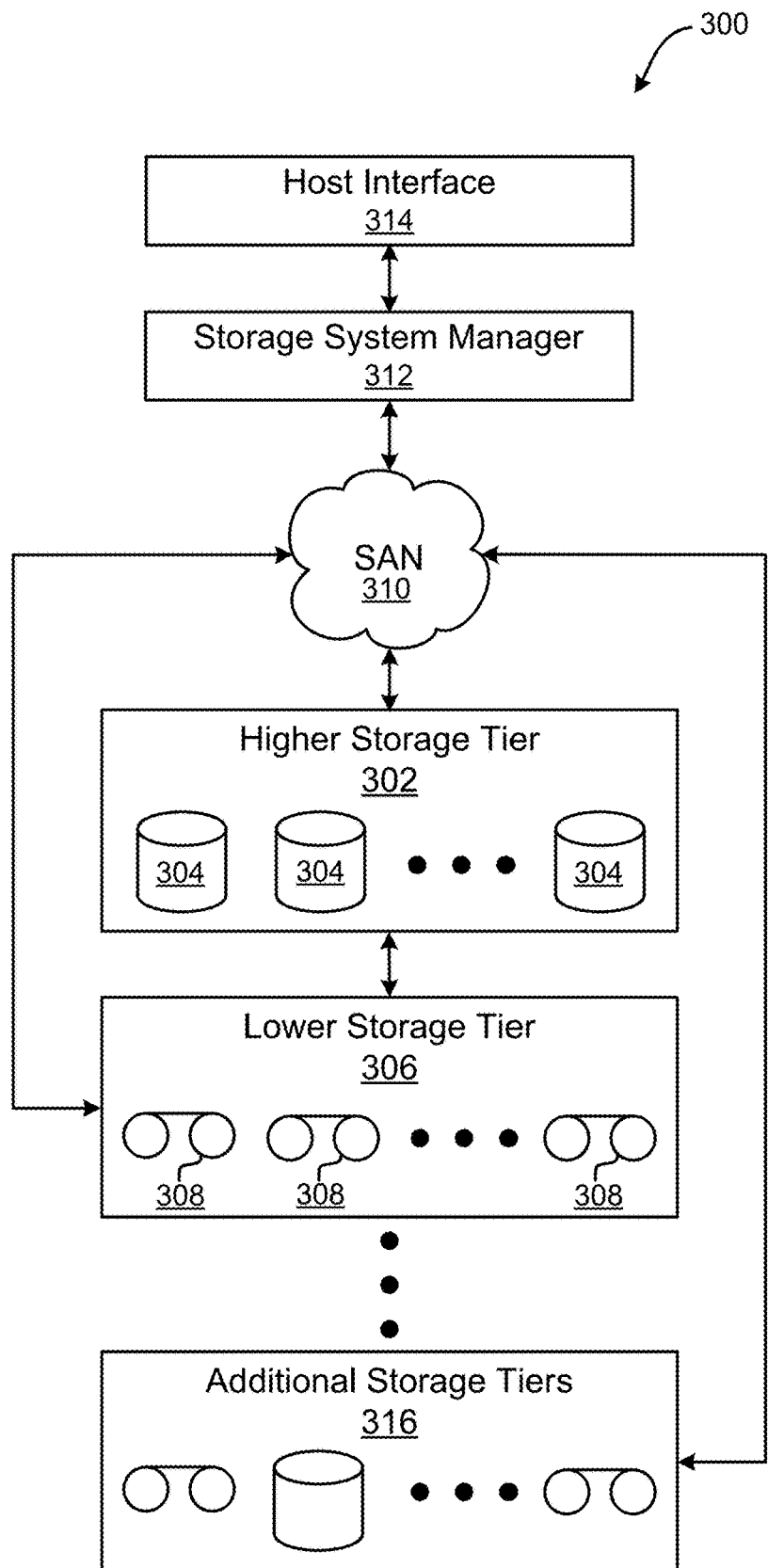
FIG. 3 is a representational view of a multi-tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, the capacity of a higher performance data storage tier is typically smaller than the capacity of a lower performance data storage tier in view of the relative cost of the different types of memory included therein. Thus, in order to maintain an efficient use of a higher performing, yet typically smaller, data storage tier, algorithms are implemented to relocate data between the tiers based on a temperature associated with the data itself.

In addition to having different levels of performance, the tiers in a multi-tiered storage environment often have a relative endurance which corresponds to the type of data operations performed thereon. In other words, certain tiers include storage drives (and/or any other type of memory components) which are better suited to perform read intensive workloads, while other tiers include memory components which are better suited to perform write intensive workloads. For instance, lower over-provisioning of read intensive storage drives causes the corresponding write performance to be reduced in view of the increased number of background operations involved with performing garbage collection and the associated write amplification. Thus, the lower over-provisioning of read intensive storage drives decreases both performance and endurance when used to perform write intensive workloads.

A read intensive storage drive is not suitable for performing write intensive workloads. To clarify this point, assume a typical heavily random workload includes about 3,394 TB of write operations to a storage drive. Even at this rate, a read intensive storage drive is pushed its maximum projected write capability for the given tiering cycle. Moreover, if the write operations exceed the storage drive's maximum write capacity for the given tiering cycle, performance of the write operation is delayed significantly, whereby a predictive failure analysis (PFA) message may indicate that the storage drive should be replaced. Ignoring the PFA message by continuing to send write operation requests to the storage drive will cause the drive to be unable to accept any additional write commands, and thereby only accepts read commands for some time. A failed write operation results in a more serious error message that indicates that the drive should be replaced. It follows that read intensive storage drives are preferably used in applications having less frequent write operations, as the memory components implemented in read intensive storage drives tend to be of lower endurance than the memory components implemented in storage drives that are targeted for write intensive and/or mixed workloads (e.g., such as mainstream endurance). As a result, the number of write operations performed by read intensive memory is preferably limited in comparison to write intensive memory.

However, conventional products have suffered in this regard. For instance, conventional products have no way of determining write throughput experienced by storage drives before a first tiering cycle has completed, as it is only after the first tiering cycle has completed that the heat map indicates the pertinent workload pattern. Thus, at least one tiering cycle must be completed in order for conventional products to determine the I/O pattern being experienced by one or more storage drives. As a result, write intensive workloads may undesirably be fielded by read intensive storage drives for an entire tiering cycle (e.g., 24 hours) before being transferred to an appropriate storage drive, thereby degrading overall system performance and endurance of the read intensive storage drive. Conventional products are also unable to identify read intensive storage drives suitable to satisfy a given I/O pattern based on storage configurations. Moreover, conventional mechanisms are lagging in getting rid of initial volume sync mechanisms following the establishment of a relationship.

In sharp contrast, various ones of the embodiments included herein are able to detect write intensive workloads even before a first tiering computation cycle of a data monitoring demon has completed. For instance, certain volumes in a virtualization layer are determined as expecting I/O patterns having increased write intensity and subsequently marked as such. These marked volumes are thereafter transferred out of read intensive storage drives to a more appropriate storage location, e.g., such as a write intensive storage drive. In certain approaches, this evaluation and/or transfer of data is triggered by a configuration change in the storage virtualization controller, e.g., as will be described in further detail below.

Figure 4:
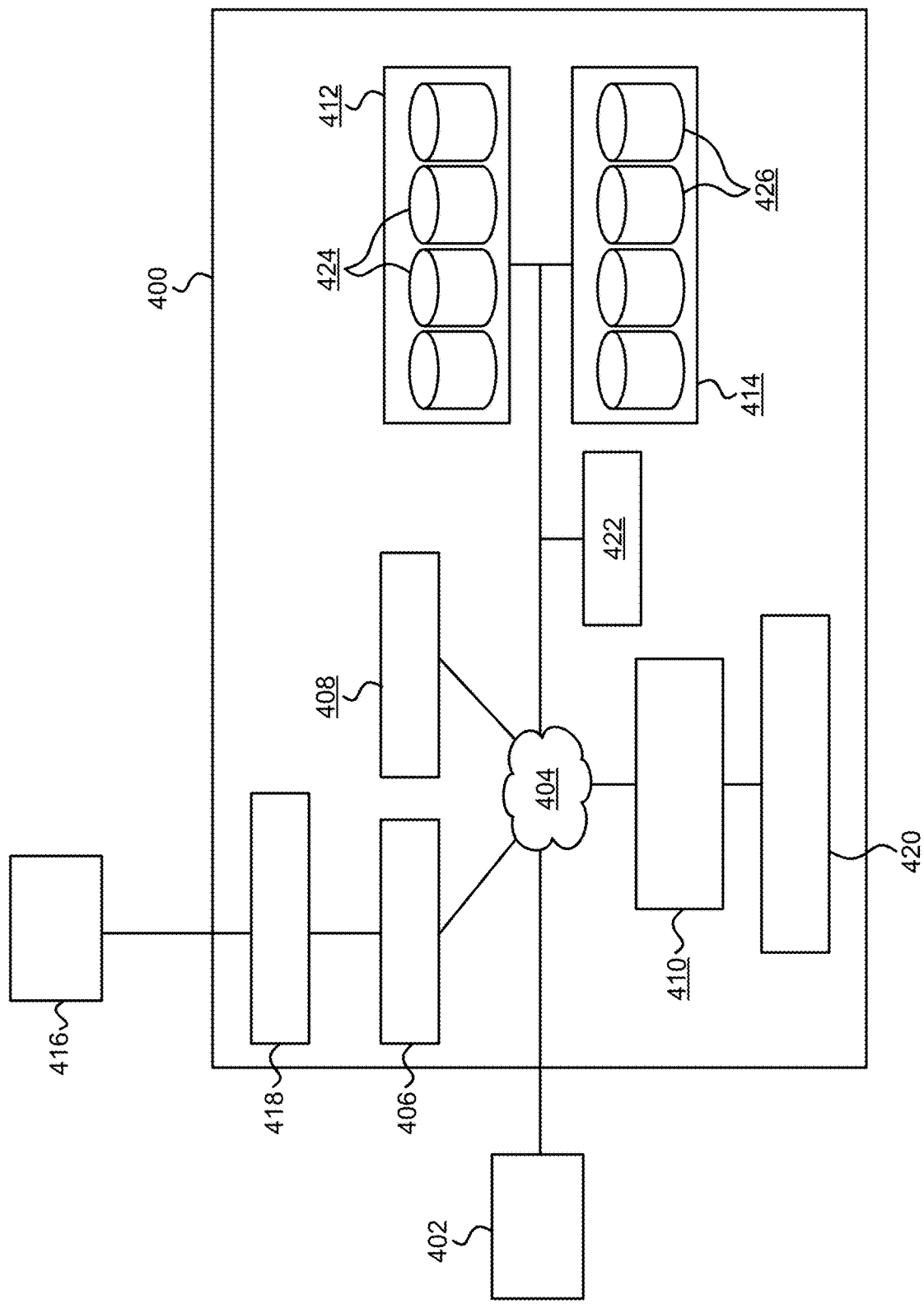
FIG. 4 is a representational view of a multi-tiered data storage system in accordance with another embodiment.

Referring now to FIG. 4, a multi-tiered data storage system 400 is illustrated in accordance with one embodiment. As an option, the present data storage system 400 may be implemented in conjunction with features from any other embodiment listed herein, such as those described with reference to the other FIGS., such as FIG. 3. However, such data storage system 400 and others presented herein may be used in various applications and/or in permutations which may or may not be specifically described in the illustrative embodiments listed herein. Further, the data storage system 400 presented herein may be used in any desired environment. Thus FIG. 4 (and the other FIGS.) may be deemed to include any possible permutation.

Looking to FIG. 4, the data storage system 400 is shown as being coupled to a host 402. Although the data storage system 400 is only coupled to one host 402 in the present embodiment, different numbers of hosts, users, other storage systems, etc. are coupled to the data storage system 400 in different approaches. Moreover, the host 402 may be coupled to the data storage system 400 using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description.

The host 402 is indirectly coupled to various components in the data storage system 400 via a network 404. As show, the network 404 connects the host 402 to a configuration manager 406, a drive manager 408, a tiering daemon 410, a higher performance storage tier 412, and a lower performance storage tier 414. Accordingly, the various components receive instructions, commands, inquiries, etc. from the host 402 through the network 404. It should be noted that the network 404 may include any desired type of network, e.g., depending on the approach. For example, in some approaches the network 404 is a SAN.

Similarly, one or more users are able to access an external user interface 416 in order to connect (e.g., wirelessly and/or using physical connections) to the configuration manager 406 through a user interface module 418. Accordingly, the external user interface 416 serves as an interface by which a user may change the configuration settings in the storage system 400. The configuration manager 406 is responsible for implementing configuration changes received from the external user interface 416 as well as managing the internal configuration settings of the storage system 400, e.g., as would be appreciated by one skilled in the art after reading the present description. In some approaches, configuration parameters are connected internally to a message queue which is used to exchange messages between the various components in the storage system 400.

The tiering daemon 410 communicates with a data placement manager 420 in order to determine where certain data is to be stored in the storage tiers 412, 414 based on a relative heat of the data, instructions received from a user, predicted I/O pattern changes, etc., as will be described in further detail below. A tiering data relocator 422 is also electrically coupled to each of the storage tiers 412, 414 and may be used to manage the data stored therein. Thus, in some approaches the tiering data relocator 422 moves data from the lower performance storage tier 414 to the higher performance storage tier 412, e.g., in response to receiving instructions to do so from the tiering daemon 410. In other approaches, the tiering data relocator 422 moves data from the higher performance storage tier 412 to the lower performance storage tier 414, e.g., in response to receiving instructions to do so from the tiering daemon 410. In still other approaches, the tiering data relocator 422 moves data between hardware-based data storage devices 424, 426 (e.g., storage drives) in a same one of the storage tiers 412, 414.

In some approaches the drive manager 408 serves as a central controller (e.g., processor) of the storage system 400. In other words, the drive manager 408 orchestrates commands, requests, inquiries, etc. received from the host 402 and/or a user accessing the external user interface 416. According to an example, which is in no way intended to limit the invention, an unmap command is received by the drive manager 408 from the host 402. As a result, the drive manager 408 issues a number of requests and/or instructions to the tiering data relocator 422, the tiering daemon 410, and/or any other components of the data storage system 400, such that the unmap command is successfully performed.

It should be noted that with respect to the present description, "higher performance" and "lower performance" are at least intended to be with respect to each other. Thus, the hardware-based data storage devices 424 included in the higher performance storage tier 412 are capable of achieving higher performance standards than the hardware-based data storage devices 426 included in the lower performance storage tier 414. Depending on the approach, the hardware-based data storage devices 424 in the higher performance storage tier 412 is able to achieve faster data access times, process larger workloads, maintain a higher level of data security, sustain a lower bit error rate, etc. than the lower performance storage tier 414.

As alluded to above, in some approaches the hardware-based data storage devices 424, 426 included in each of the respective storage tiers 412, 414 also have a relative endurance which corresponds to the type of data operations performed thereon. In other words, certain types of hardware-based data storage devices are better suited to perform read intensive workloads, while other types of hardware-based data storage devices are better suited to perform write intensive workloads. For instance, lower over-provisioning of read intensive storage devices causes the corresponding write performance to be reduced in view of the increased number of background operations involved with performing garbage collection and the associated write amplification. Thus, the lower over-provisioning of read intensive storage devices decreases both performance and endurance when used to perform write intensive workloads.

In some approaches, each tier in a multi-tiered data storage system includes data storage devices which have a same, or at least similar, endurance corresponding to the type of data operations performed thereon. Thus, in addition to having different relative performance characteristics, each of the tiers are also better suited to perform certain types of data operations. It follows that each of the tiers are preferably used to perform the types of operations (e.g., satisfy the types of workloads) that they are best suited to satisfy, not only in the interest of maintaining efficiency, but also to avoid causing unnecessary degradation to the memory itself. For example, read intensive storage devices included in a first tier are preferably used to satisfy read intensive workloads, while write intensive storage devices in a second tier are preferably used to satisfy write intensive workloads. Accordingly, an accurate and updated understanding of the data temperatures and I/O patterns for the different memory components is desired at all times. This is true even for situations which precede a first tiering cycle of the storage system, which has been unachievable for conventional products. In order to achieve these desirable results, one or more of the processes included in method 500 below may be implemented by a storage system, e.g., as will soon become apparent.

Figure 5:
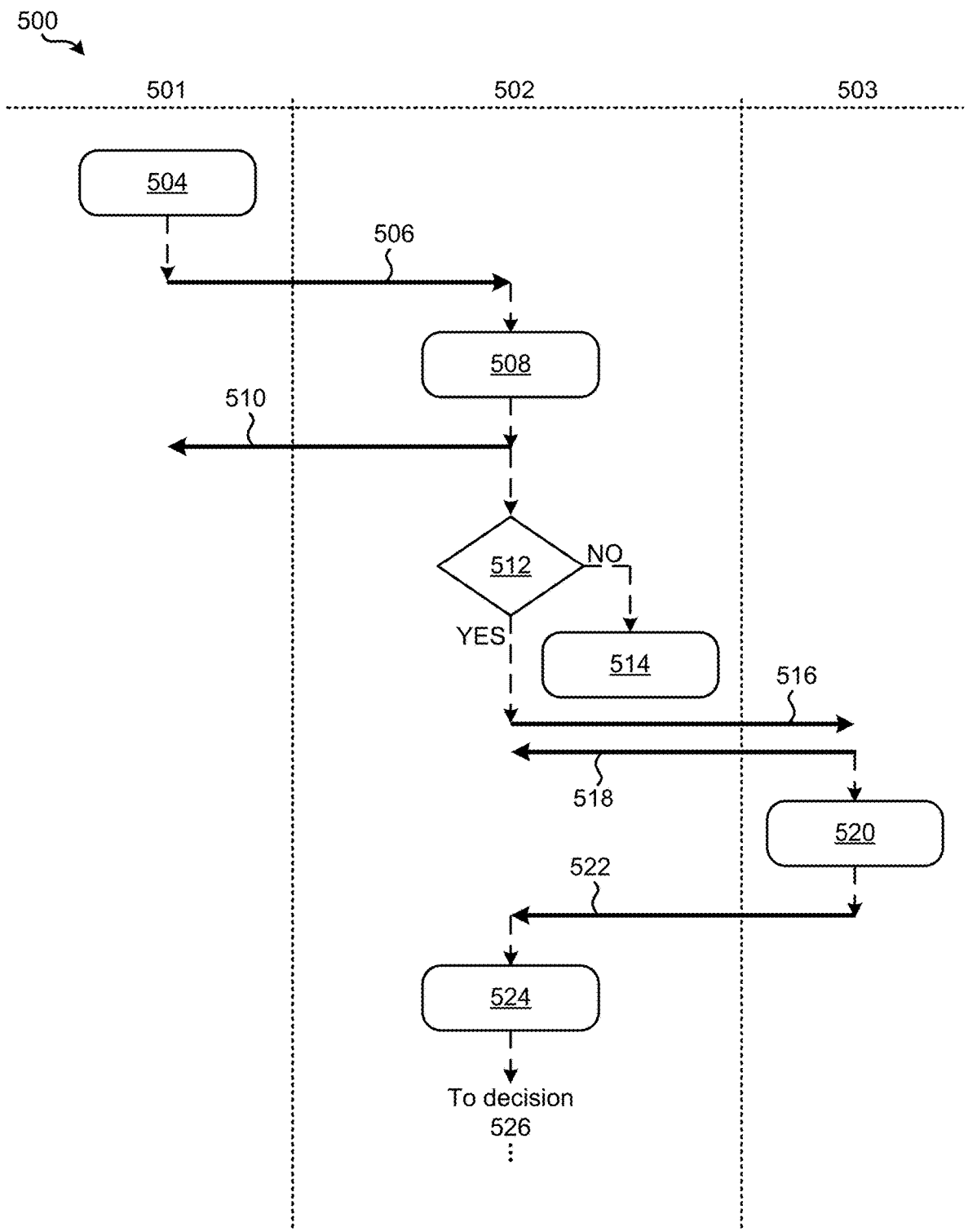
FIG. 5 is a flowchart of a method in accordance with one embodiment.
Figure 5:
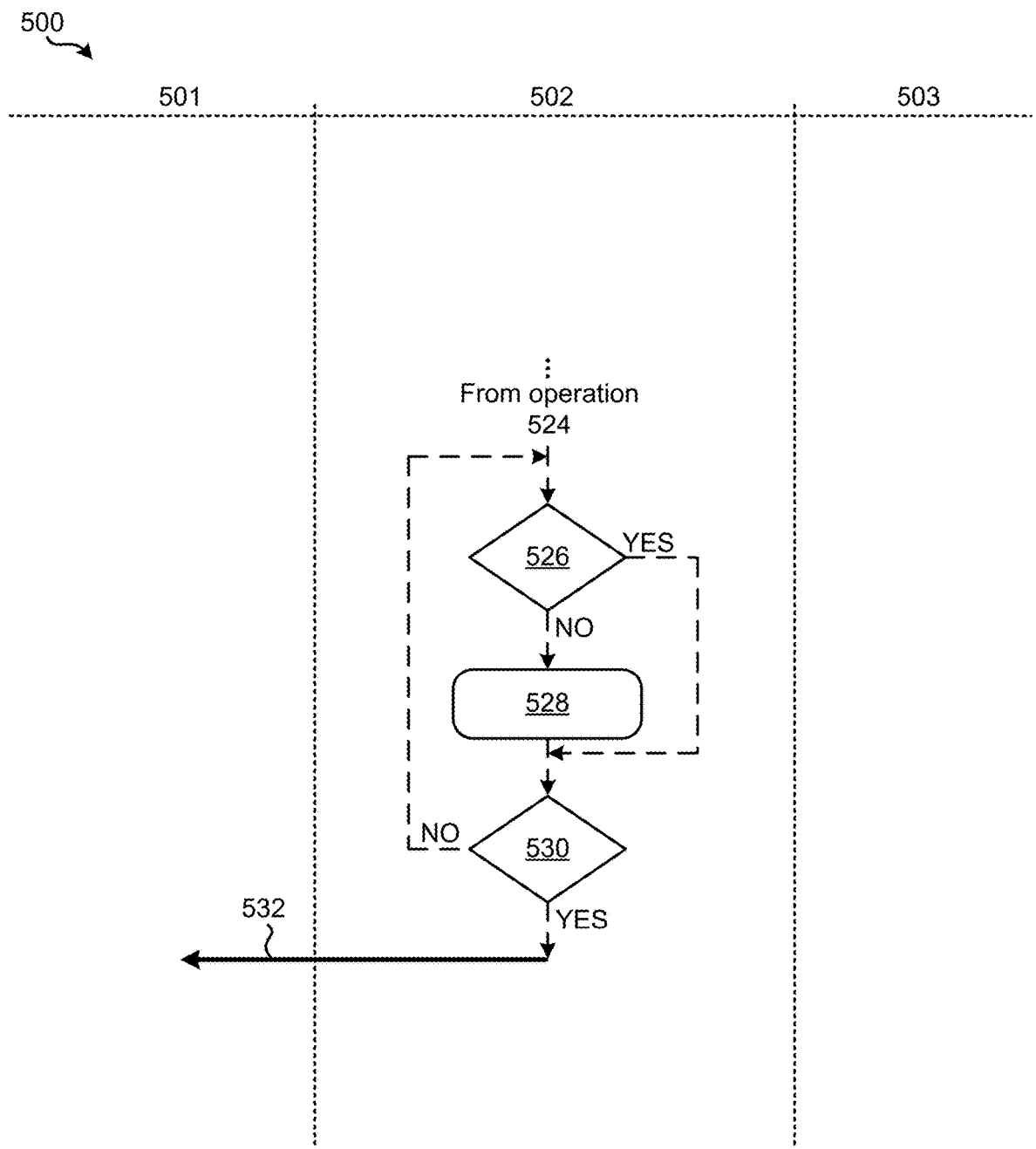

Now referring to FIG. 5, a flowchart of a computer-implemented method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, each of the nodes 501, 502, 503 shown in the flowchart of method 500 may correspond to one or more processors positioned at a different location in a multi-tiered data storage system. Moreover, each of the one or more processors are preferably configured to communicate with each other.

In various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 5 includes different nodes 501, 502, 503, each of which represent one or more processors, controllers, computer, etc., positioned at a different location in a multi-tiered data storage system. For instance, in some approaches node 501 includes one or more processors which are included in a configuration manager of a multi-tiered data storage system (e.g., see 406 of FIG. 4 above). Moreover, in some approaches node 503 may include one or more processors which are included in a drive manager of a multi-tiered data storage system (e.g., see 408 of FIG. 4 above). Furthermore, node 502 includes one or more processors which are included in a tiering data relocator of a multi-tiered data storage system (e.g., see 422 of FIG. 4 above), the tiering data relocator being in communication with the one or more processors at each of nodes 501 and 503. Accordingly, commands, data, requests, etc. may be sent between each of the nodes 501, 502, 503 depending on the approach. Moreover, it should be noted that the various processes included in method 500 are in no way intended to be limiting, e.g., as would be appreciated by one skilled in the art after reading the present description. For instance, data sent from node 502 to node 503 may be prefaced by a request sent from node 503 to node 502 in some approaches.

As shown, operation 504 of method 500 is performed at node 501 and includes receiving a configuration change for the virtualization layer of a multi-tiered data storage system. In some approaches, the configuration change is received as an instruction issued by a user through a user interface. Moreover, in response to receiving the configuration change, a signal is sent from node 501 to node 502 which indicates that the configuration change has been received. See operation 506. Accordingly, operation 508 at node 502 includes detecting that a configuration change for a virtualization layer in a multi-tiered data storage system has been received. An optional acknowledgement is sent back to node 501 in some approaches, the acknowledgement informing node 501 that the configuration change was detected. See operation 510.

Moving to decision 512, a determination is made as to whether the configuration change corresponds to (will trigger) a tiering adjustment in the virtualization layer. In other words, decision 512 determines whether the configuration change corresponds to an inactive command (e.g., such as a view command), or an active command (e.g., such as a change and/or task command). Certain types of configuration changes may regularly correspond to an active command which causes a tiering adjustment in the virtualization layer, and may therefore be predetermined as corresponding to a tiering adjustment. For instance, according to an illustrative approach which is in no way intended to limit the invention, decision 512 involves determining whether the configuration change includes an online volume expansion operation, as volume expansion operations involve performing tiering adjustments.

From decision 512, method 500 proceeds to operation 514 in response to determining that the configuration change does not correspond to a tiering adjustment in the virtualization layer, whereby method 500 ends. However, it should be noted that although method 500 ends upon reaching operation 514 in some approaches, any one or more of the processes included in method 500 may be repeated in order to process additional configuration changes.

Returning to decision 512, the flowchart proceeds to operation 516 in response to determining that the configuration change does correspond to a tiering adjustment in the virtualization layer. There, operation 516 includes sending a request to node 503 for the suitable pattern which corresponds to the storage device in which the tiering adjustment will occur. Upon receiving the request, node 503 optionally returns an acknowledgement which informs node 502 that the request was received. See operation 518. Moreover, operation 520 includes collecting the suitable pattern requested in operation 516. The suitable pattern for a given storage device corresponds to the type of I/O patterns which the storage device is suitable to satisfy. In other words, the suitable pattern for a given storage device indicates which I/O patterns the storage device has a relative endurance for. For example, the suitable pattern for a write intensive storage device includes write intensive I/O patterns. In some approaches, the suitable pattern is collected by evaluating the given storage device and analyzing the data stored therein. In other approaches, the suitable pattern is collected from storage in a central memory (e.g., lookup table).

As shown in operation 522, the collected suitable pattern is returned to node 502. Operation 524 further includes predicting I/O pattern changes which will result from the configuration change. In other words, operation 524 includes predicting any changes which will occur as a result of the tiering adjustment caused by performing the configuration change to the virtualization layer. Information included in the suitable pattern collected by node 503 is used in some approaches to make the predictions with respect to I/O pattern changes, e.g., as will be described in further detail below (see method 600). Moreover, the predictions made in operation 524 are performed regardless of whether a first tiering cycle of the multi-tiered data storage system has completed. As mentioned above, temperature-based information as well as I/O pattern information is associated with previously experienced performance data, which may be gleaned from previously completed tiering cycles of the storage system. Accordingly, previously completed tiering cycles are used in some approaches to predict I/O pattern changes.

However, before a first tiering cycle has completed, there is no previously experienced performance data available to make such predictions. Conventional products have thereby been unable to predict I/O pattern changes prior to the completion of a first tiering cycle, thus subjecting various storage devices to undesirable degradation caused by executing types of operations which they are not suitable to perform. In sharp contrast, various ones of the embodiments included herein are able to predict the I/O pattern changes before a first tiering cycle of the multi-tiered data storage system has completed. It should be noted that with respect to the present description, the "first" tiering cycle in this context refers to the first tiering cycle performed after a scheduled system shutdown, an unscheduled system shutdown, or any other type of situation in which a heat map of the various extents stored in the different types of memory in the storage system is not available.

Predicted I/O pattern changes correspond to specific extents in memory. Thus, decision 526 includes determining, for each specific extent which corresponds to the predicted I/O pattern changes, whether the given specific extent is stored in a tier of the multi-tiered data storage system that is suitable to satisfy the predicted I/O pattern changes which correspond to the given specific extent. According to an illustrative example, which is in no way intended to limit the invention, operation 524 predicts that a write intensive I/O pattern change will occur for "Extent X" as a result of the configuration change. Decision 526 then includes determining whether the storage tier in which Extent X is physically located is suitable to satisfy the predicted write intensive I/O pattern change for Extent X, assuming the prediction made in operation 524 is accurate. Extent X is not migrated from its current storage location in response to determining that the storage tier in which Extent X is physically located is suitable to satisfy the predicted write intensive I/O pattern change. However, in response to determining that the storage tier in which Extent X is physically located is not suitable to satisfy the predicted write intensive I/O pattern change, Extent X is migrated to a different tier which is suitable to satisfy the predicted write intensive I/O pattern change (e.g., see operation 528 below).

As used herein, a hardware-based data storage device (e.g., storage drive) which is "suitable to satisfy" a given I/O pattern or workload is intended to refer to storage devices which are configured to have a relative endurance which corresponds to the type of data operations included in the given I/O pattern or workload. As described above, in addition to having different levels of performance, different types of storage devices have a relative endurance which corresponds to the type of data operations performed thereon. In other words, certain hardware-based data storage devices are better suited to perform read intensive workloads, while other others are better suited to perform write intensive workloads. For instance, lower over-provisioning of read intensive storage devices causes the corresponding write performance to be reduced in view of the increased number of background operations involved with performing garbage collection and the associated write amplification. Thus, the lower over-provisioning of read intensive storage devices decreases both performance and endurance when used to perform write intensive workloads. In other words, read intensive storage devices are not "suitable to satisfy" write intensive I/O patterns or workloads, but are "suitable to satisfy" read intensive I/O patterns or workloads. Storage devices which are suitable to satisfy the same types of operations are also grouped together on a same tier of a multi-tiered data storage systems in some approaches. Hence, each of the tiers of a multi-tiered data storage system are suitable to satisfy a different type of operation with respect to each other, e.g., as would be appreciated by one skilled in the art after reading the present description.

Referring still to FIG. 5, method 500 proceeds to operation 528 in response to determining that the given specific extent is stored in a tier of the multi-tiered data storage system which is not suitable to satisfy the predicted I/O pattern changes which correspond to the given specific extent. There, operation 528 includes migrating the given specific extent to another one of the tiers in the multi-tiered data storage system determined as being suitable to satisfy the predicted I/O pattern changes.

The tier which the given specific extent is actually migrated to depends on the type of operations included in the predicted I/O pattern changes. For instance, an extent which corresponds to a write intensive predicted I/O pattern change is preferably migrated from a first tier which is suitable to satisfy read intensive I/O patterns, to a second tier which is suitable to satisfy write intensive I/O patterns. In doing so, the overarching data storage system maintains efficient performance while also avoiding any degradation to the storage devices included in the first tier, thereby increasing an effective lifespan of the data storage devices in the first tier. In other words, the hardware-based data storage devices included in the first tier of memory will not suffer the detrimental side effects of having to perform the write intensive I/O pattern. Similarly, an extent which corresponds to a read intensive predicted I/O pattern change is preferably migrated from a second tier which is suitable to satisfy write intensive I/O patterns, to a first tier which is suitable to satisfy read intensive I/O patterns. This again allows for the overarching data storage system to maintain efficient performance while also avoiding any degradation to the storage devices included in the second tier, thereby increasing an effective lifespan of the data storage devices in the second tier.

From operation 528, method 500 proceeds to decision 530 which includes determining whether each of the specific extents which correspond to the predicted I/O pattern changes have been evaluated. In response to determining that each of the specific extents which correspond to the predicted I/O pattern changes have not yet been evaluated, the flowchart returns to decision 526. It follows that processes 526, 528, and 530 may be repeated in an iterative loop until each of the specific extents which correspond to the predicted I/O pattern changes have been evaluated. Accordingly, in response to determining that each of the specific extents which correspond to the predicted I/O pattern changes have been evaluated, method 500 proceeds to operation 532. There, operation 532 includes sending a notification to node 501 that the configuration change to the virtualization layer and corresponding tiering adjustments have been successfully implemented.

In addition to predicting I/O pattern changes, some embodiments also incorporate previous performance information. For instance, a storage device is able to collect performance information and determine certain I/O patterns it was able to perform desirably. The tiering mechanism is able to further use this information to determine when and/or where certain extents should be migrated to.

According to several examples, which are in no way intended to limit the invention, the tiering mechanism may identify a known storage device which is preferred to perform a particular workload, instruct a storage device to describe itself with some inquiry data, operate in conjunction with a tiering algorithm to analyze drive performance over time as data is moved onto a particular type of storage, etc. These examples and others may be implemented by maintaining the I/O pattern type of various operations that are performed, along with the latency associated with each of the I/O patterns for the storage devices in the storage system. In some approaches, once this data is stored, the tiering manager seeks for a suitable drive by sending an enquiry command to candidate storage devices and determining a corresponding response. The collected responses are mapped with respect to a configuration of the storage controller for tiering adjustments.

This cognitive analysis can be used to compute the storage device type which is preferred for a given I/O pattern, as well as mapping to the application I/O types, particularly equipped with previous performance information. According to one example, REST application programming interfaces (APIs) are used as an application interface for analytics which may be embedded to determine the preferred storage device for the given I/O pattern. Accordingly, past I/O patterns are analyzed such that the system is able to become increasingly more efficient and accurate over time, thereby increasing the amount of endurance that is preserved.

In some approaches, communication between a disk driver, an analytics application, and multi-tier applications use either separate out-of-band protocol or reserved fields in the write Command Descriptor Block (CDB), e.g., such as a SCSI CDB. For instance, reserved fields in the write CBD can be used. In some approaches, both of these capabilities are layers in a same storage controller, thereby allowing the foregoing information to be passed across the layers. However, any other independent mechanism which would be apparent to one skilled in the art after reading the present description may be used. For example, a DS8000 data storage device implements a mechanism to communicate heat map information from one storage system to another. This ensures that in a remote copy scenario, the correct data is located in read intensive memory components when the access is failed over to remote sites. Similar implementations can also be used in approaches involving the use of reserved fields of write CDB.

Figure 6:
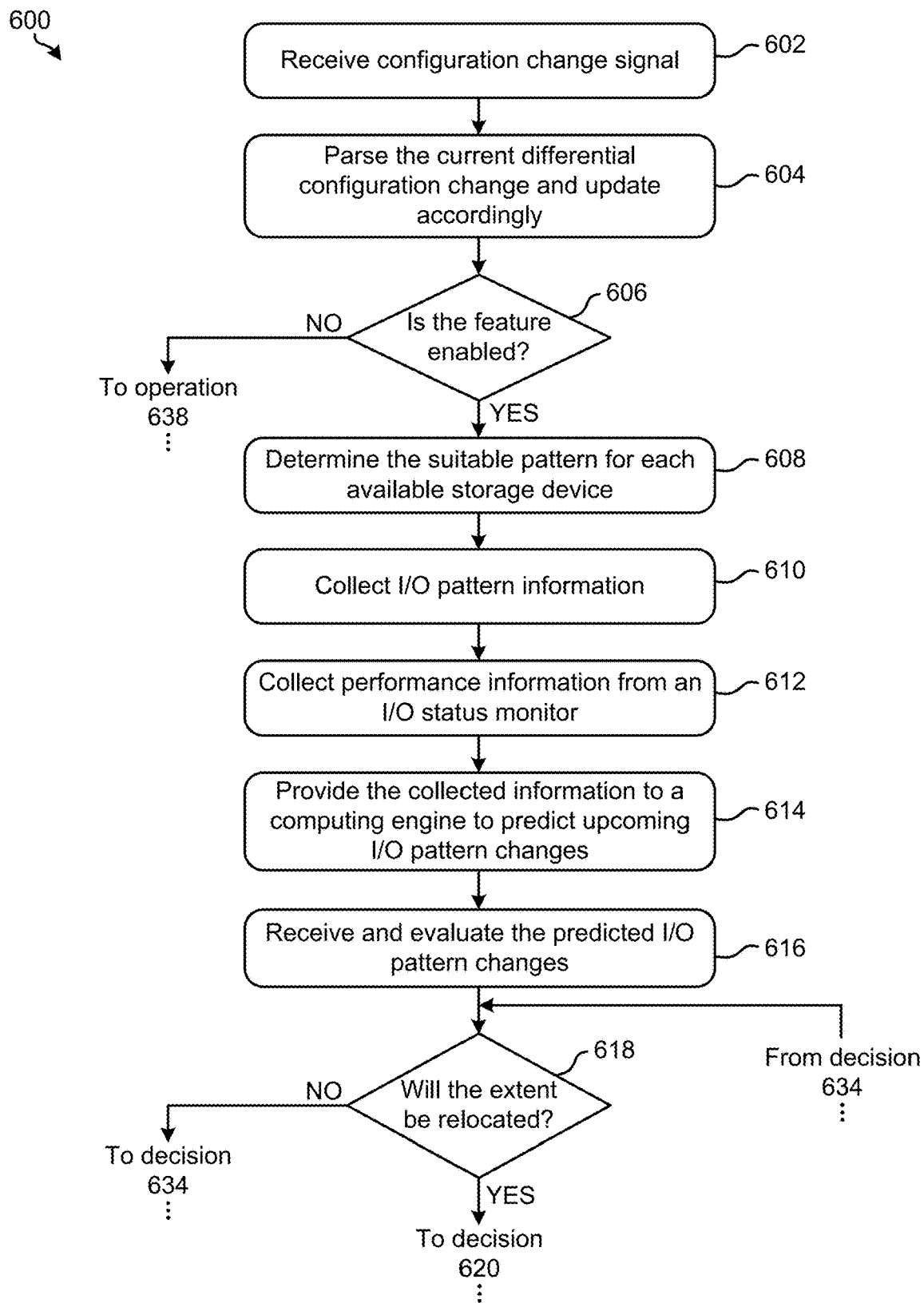
FIG. 6 is a flowchart of a method in accordance with another embodiment.
Figure 6:
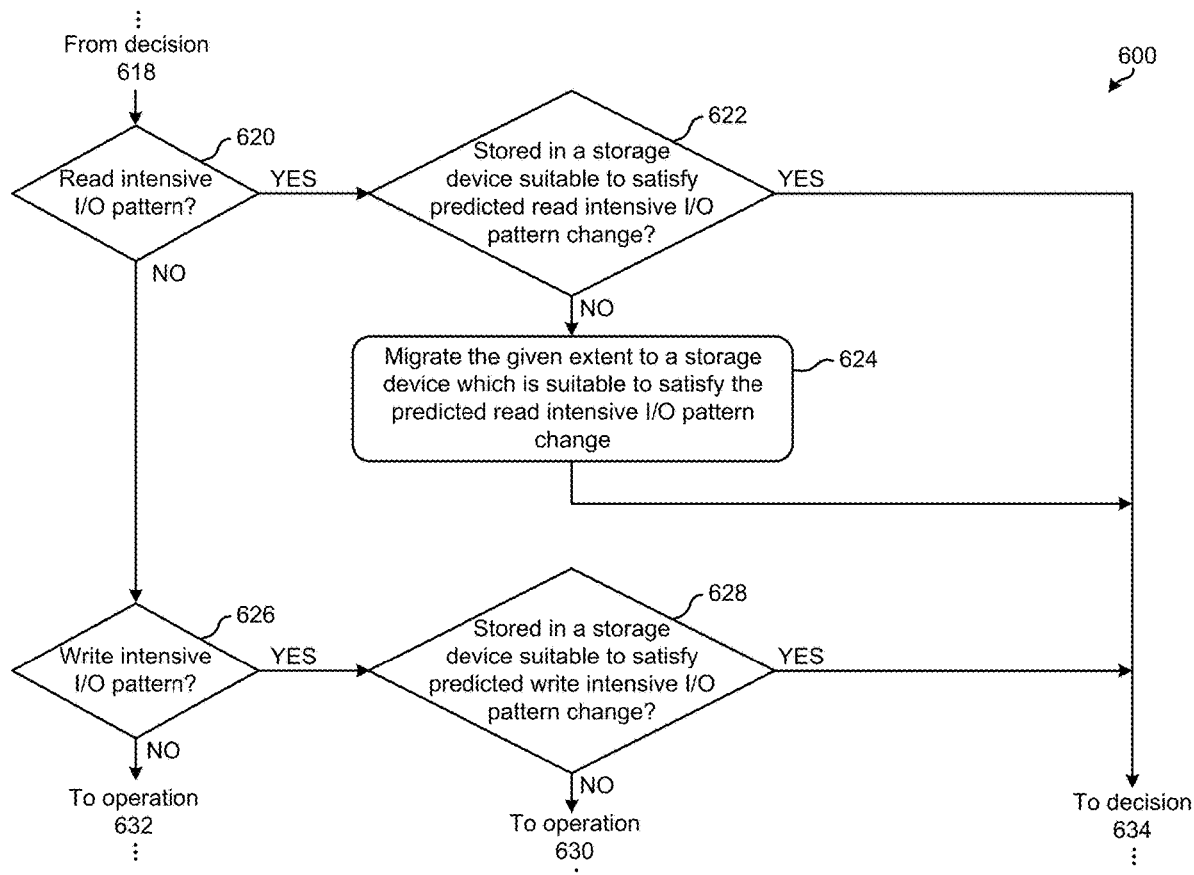
Figure 6:
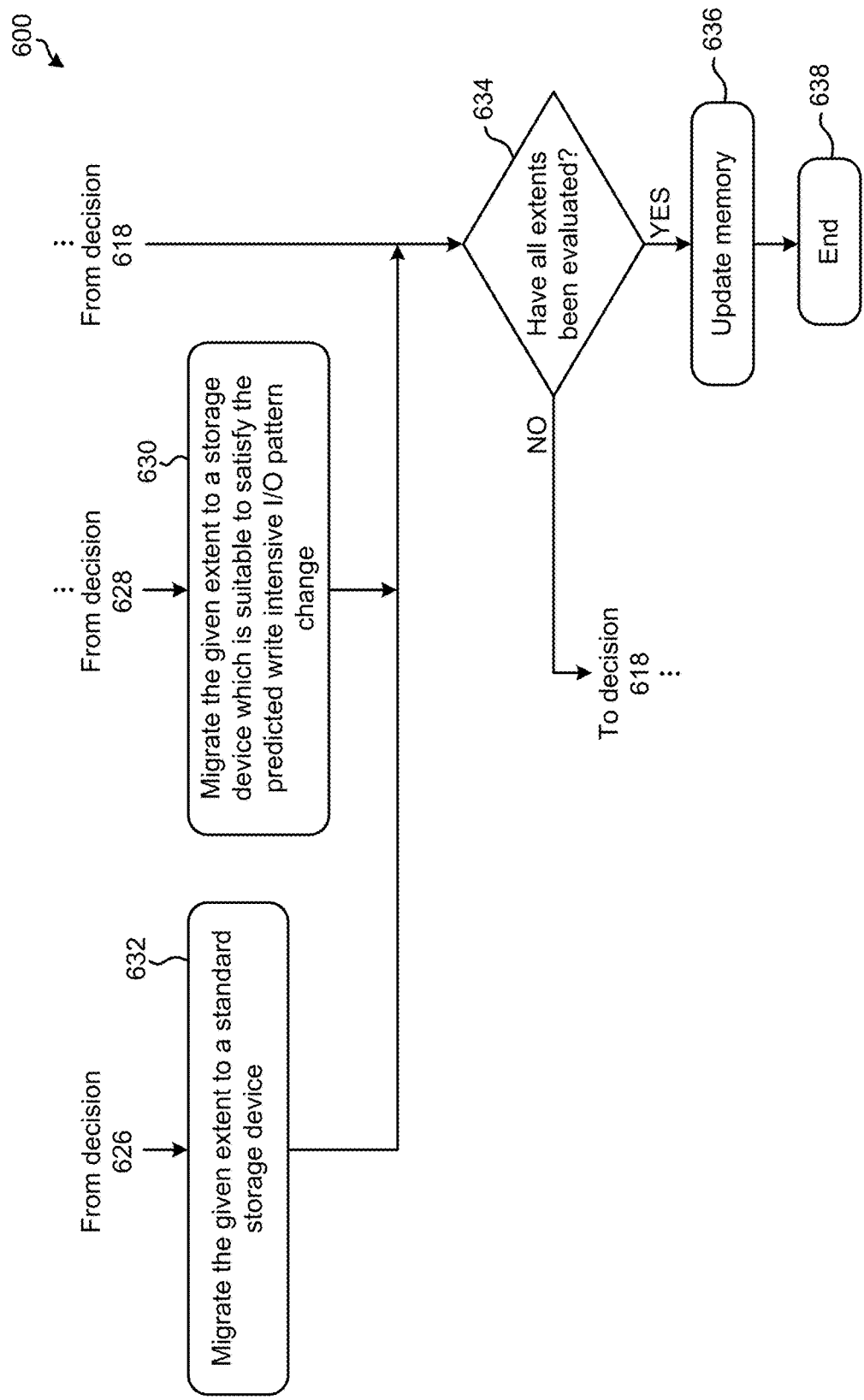

Looking now to FIG. 6, a method 600 for implementing a configuration change to the virtualization layer of a storage system is shown according to one embodiment. Accordingly, some of the processed included in method 600 are similar to those presented above with respect to method 500. Moreover, the method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, operation 602 of method 600 includes receiving a configuration change signal, while operation 604 includes parsing the current differential configuration change and updating accordingly. Decision 606 includes determining whether the feature of predicting I/O pattern changes is enabled for the particular storage device and/or the specific configuration change, where method 600 jumps directly to operation 638 in response to determining that the feature is not enabled. Upon reaching operation 638, method 600 ends. However, it should be noted that although method 600 may end upon reaching operation 638, any one or more of the processes included in method 600 may be repeated in order to process additional configuration change signals.

Returning to decision 606, method 600 proceeds to operation 608 in response to determining that the feature is enabled, whereby the suitable pattern for each available storage device is determined. As mentioned above, the suitable pattern for a given storage device corresponds to the type of I/O patterns which the storage device is suitable to satisfy. In other words, the suitable pattern for a given storage device indicates which I/O patterns the storage device has a relative endurance for. For example, the suitable pattern for a write intensive storage device includes write intensive I/O patterns. In some approaches the suitable pattern for each storage device in a storage system may be stored in a central system memory. Accordingly, operation 608 includes retrieving the suitable patterns from a central system memory in some approaches. In other approaches, each of the storage devices in the storage system may be prompted with a request for the respective suitable pattern.

Moving to operation 610, here method 600 includes collecting I/O pattern information. According to some approaches, the I/O pattern information may be collected from a data processing addendum, e.g., as would be appreciated by one skilled in the art after reading the present description. Operation 612 further includes collecting performance information (e.g., such as latency and other factors) from an I/O status monitor. The information gleaned in the foregoing operations is provided to a computing engine in order to predict upcoming I/O pattern changes. See operation 614. According to some approaches, a computing engine equipped with some form of artificial intelligence is used to predict the I/O pattern changes, e.g., as would be appreciated by one skilled in the art. It follows that the I/O pattern changes are predicted based, at least in part, on the configuration settings of the available storage devices and current I/O pattern information.

In operation 616, the predicted I/O pattern changes are received and preferably used to evaluate each of the extents which correspond to (e.g., will be affected by) the configuration change. Accordingly, decision 618 includes determining whether a given extent will be relocated (e.g., migrated) as a result of the configuration change. In response to determining that the given extent is not predicted to be relocated, method 600 jumps directly to decision 634. However, in response to determining that the given extent is predicted to be relocated, method 600 proceeds to decision 620 which determines whether the given extent will experience a read intensive I/O pattern as a result of the configuration change. In response to determining that the given extent will experience a read intensive I/O pattern as a result of the configuration change, decision 622 is performed. Decision 622 includes determining whether the given extent is currently stored in a storage device which is suitable to satisfy the predicted read intensive I/O pattern change. In response to determining that the given extent is not currently stored in a storage device which is suitable to satisfy the predicted read intensive I/O pattern change, operation 624 is performed which includes migrating the given extent to a storage device which is suitable to satisfy the predicted read intensive I/O pattern change. Typically the given extent will be transferred to a different tier of memory than the one it was stored on. From operation 624, method 600 jumps to decision 634.

Returning to decision 620, the flowchart proceeds to decision 626 in response to determining that the given extent will not experience a read intensive I/O pattern as a result of the configuration change. There, decision 626 includes determining whether the given extent will experience a write intensive I/O pattern as a result of the configuration change. In response to determining that the given extent will experience a write intensive I/O pattern as a result of the configuration change, method 600 proceeds to decision 628 which includes determining whether the given extent is currently stored in a storage device which is suitable to satisfy the predicted write intensive I/O pattern change. In response to determining that the given extent is not currently stored in a storage device which is suitable to satisfy the predicted write intensive I/O pattern change, operation 630 is performed which includes migrating the given extent to a storage device which is suitable to satisfy the predicted write intensive I/O pattern change. Typically the given extent will be transferred to a different tier of memory than the one it was stored on. From operation 630, method 600 jumps to decision 634.

Returning to decision 626, method proceeds to operation 632 in response to determining that the given extent will not experience a write intensive I/O pattern as a result of the configuration change. There, operation 632 includes migrating the given extent to a standard storage device. The standard storage device may include memory which is neither read intensive nor write intensive, but rather has nominal performance characteristics, e.g., such as an HDD. Accordingly, the read intensive and write intensive storage devices may be reserved for use in situations which will benefit from their respective higher tolerance to more unbalanced workloads, e.g., as would be appreciated by one skilled in the art after reading the present description.

From operation 632, method 600 proceeds to decision 634 which determines whether each of the extents which correspond to the configuration change have been evaluated. The flowchart returns to decision 618 in response to determining that each of the extents have not been evaluated, e.g., such that a subsequent extent may be evaluated. However, in response to determining that each of the extents have been evaluated, method 600 proceeds to operation 636 which includes updating memory to reflect the extent migrations, I/O pattern predictions, performance efficiency, etc. Moreover, operation 638 is reached, whereby method 600 ends. However, it should again be noted that although method 600 may end upon reaching operation 638, any one or more of the processes included in method 600 may be repeated in order to process additional configuration changes.

Accordingly, method 600 deals with system configurations as well as the associated I/O estimations and data placement, particularly across the read intensive memory. As a result, system performance is improved and the write I/O workload experienced by read intensive memory is reduced, even before a first tiering computation. This greatly reduces the read intensive memory wear. These improvements are achieved in many approaches by parsing the system configuration and respective I/O anticipation mapping.

For example, artificial intelligence based mechanisms consider the number of storage devices in the system, tiering heat measurements for certain extents, e.g., drive, read and write I/O statistics, latency experienced, I/Os per second (TOPS) experienced, etc. The suitable I/O pattern for each of the storage devices is also considered, along with the current configuration of the system and future I/O anticipations. Based on the obtained inputs, the cognition enabled platform maps the I/O patterns based on the storage devices while considering the foregoing peripheral variables. With this information, the computing engine is able to determine that the Extent Y was a part of primary Volume copy at time t and was experiencing read intense I/Os. Furthermore, Extent Y was getting L latency and a maximum of M TOPS. Based on the information insights detected, the computing engine provides the suitable storage device for data placement considering the current configuration change and relative I/O expectations. For instance, the cognitive analysis is used to compute the suitable storage device type and/or map to the application I/O types.

The improvements attained by the various embodiments included herein are accomplished, at least in part, due to the fact that the I/O pattern change predictions are made based on configuration settings in the virtualization layer of the multi-tiered data storage system, which has not been conventionally achievable. Accordingly, these improvements are realized irrespective of whether a first tiering cycle of the storage system has been completed, which has also been unachievable for conventional products. It follows that some of the embodiments included herein are able to overcome the conventional shortcomings. For instance, extents will be placed based on their I/O pattern, and therefore write intensive and hot extents will not be placed in read intensive storage devices. Accordingly, the functional integrity of the read intensive storage devices will be preserved. According to an example, copy services destinations at remote sites will not be moved to read intensive storage devices in the interest of memory longevity. Moreover, once a tiering cycle has completed, candidate destination drives are enquired for their desired I/O pattern, and a destination is selected based on the drive response characteristics.

Various ones of the approaches included herein are also able to decide tiering adjustment triggers and act upon them. For example, a user who is configuring 10 remote copy relationships will not trigger an evaluation after each of the 10 configuration changes in order to avoid an undesirably high amount of computation utilization. Rather, certain configuration changes will trigger an evaluation to be performed per predetermined unit time. Moreover, administrative tasks are integrated in some approaches involving extent placement. In some approaches, an initial volume sync operation may be increased by performing extent placement to non-read intensive storage devices.

According to an in-use example, which is in no way intended to limit the invention, a storage administrator logs into the storage virtualization system and performs at least one configuration related change thereto. For instance, one of the configuration related changes includes creating two volumes from an existing storage pool, where at least some extents in each of the two volumes are stored in read intensive Flash memory. The administrator further creates a relationship across the two volumes such that one of the volumes serves as a copy source, and the other serves as a copy target, e.g., for backup purposes. This relationship between the two volumes is then used to predict that the copy target volume will experience a write intensive I/O pattern, while the copy source volume will experience a read intensive I/O pattern. Extents included in each of the volumes are thereby migrated to storage devices in a tier which is suited to satisfy the respective I/O pattern, thereby avoiding any detrimental effects to the storage devices themselves. For instance, a tiering daemon is informed of the configuration changes in some approaches, e.g., such that extents predicted to experience write intensive I/O patterns are moved out of read intensive memory components, thereby preserving the read intensive memory components. Moreover, these predictions are desirably made even before a first tiering cycle is completed, which again has been conventionally unachievable.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    detecting that a configuration change for a virtualization layer in a multi-tiered data storage system has been received;
    determining whether the configuration change corresponds to a tiering adjustment;
    in response to determining that the configuration change corresponds to a tiering adjustment, predicting input/output (I/O) pattern changes which will result from the configuration change;
    determining, for each specific extent corresponding to the predicted I/O pattern changes, whether the specific extent is stored in a tier of the multi-tiered data storage system that is suitable to satisfy the predicted I/O pattern changes which correspond to the respective specific extent; and
    in response to determining that at least one of the specific extents is stored in a tier of the multi-tiered data storage system which is not suitable to satisfy the predicted I/O pattern changes which correspond to the at least one specific extent, migrating the at least one specific extent to another one of the tiers in the multi-tiered data storage system determined as being suitable to satisfy the predicted I/O pattern changes.

2. The computer-implemented method of claim 1, wherein the I/O pattern changes are predicted before a first tiering cycle of the multi-tiered data storage system has completed.

3. The computer-implemented method of claim 1, wherein the multi-tiered data storage system includes at least a first tier and a second tier, wherein the first tier includes one or more data storage devices which are suitable to satisfy read intensive I/O patterns, wherein the second tier includes one or more data storage devices which are suitable to satisfy write intensive I/O patterns.

4. The computer-implemented method of claim 3, wherein migrating the at least one specific extent to another one of the tiers in the multi-tiered data storage system determined as being suitable to satisfy the predicted I/O pattern changes includes:
    migrating specific extents which correspond to write intensive predicted I/O pattern changes from the first tier to the second tier, thereby increasing an effective lifespan of the data storage devices in the first tier.

5. The computer-implemented method of claim 3, wherein migrating the at least one specific extent to another one of the tiers in the multi-tiered data storage system determined as being suitable to satisfy the predicted I/O pattern changes includes:
    migrating specific extents which correspond to read intensive predicted I/O pattern changes from the second tier to the first tier.

6. The computer-implemented method of claim 3, wherein the operations are performed by a tiering data relocator electrically coupled to the first and second tiers.

7. The computer-implemented method of claim 1, wherein determining whether the configuration change corresponds to a tiering adjustment includes: determining whether the configuration change includes a volume expansion operation.

8. A system, comprising:
    a processor; and
    logic integrated with the processor, executable by the processor, or integrated with and executable by the processor, the logic being configured to:
    detect, by the processor, that a configuration change for a virtualization layer in a multi-tiered data storage system has been received;
    determine, by the processor, whether the configuration change corresponds to a tiering adjustment;
    in response to determining that the configuration change corresponds to a tiering adjustment, predict, by the processor, input/output (I/O) pattern changes which will result from the configuration change;
    determine, by the processor for each specific extent corresponding to the predicted I/O pattern changes, whether the specific extent is stored in a tier of the multi-tiered data storage system that is suitable to satisfy the predicted I/O pattern changes which correspond to the respective specific extent; and
    in response to determining that at least one of the specific extents is stored in a tier of the multi-tiered data storage system which is not suitable to satisfy the predicted I/O pattern changes which correspond to the at least one specific extent, migrate, by the processor, the at least one specific extent to another one of the tiers in the multi-tiered data storage system determined as being suitable to satisfy the predicted I/O pattern changes,
    wherein the I/O pattern changes are predicted before a first tiering cycle of the multi-tiered data storage system has completed.

9. The system of claim 8, wherein the multi-tiered data storage system includes at least a first tier and a second tier, wherein the first tier includes one or more data storage devices which are suitable to satisfy read intensive I/O patterns, wherein the second tier includes one or more data storage devices which are suitable to satisfy write intensive I/O patterns.

10. The system of claim 9, wherein migrating the at least one specific extent to another one of the tiers in the multi-tiered data storage system determined as being suitable to satisfy the predicted I/O pattern changes includes:
    migrating specific extents which correspond to write intensive predicted I/O pattern changes from the first tier to the second tier, thereby increasing an effective lifespan of the data storage devices in the first tier.

11. The system of claim 9, wherein migrating the at least one specific extent to another one of the tiers in the multi-tiered data storage system determined as being suitable to satisfy the predicted I/O pattern changes includes:
    migrating specific extents which correspond to read intensive predicted I/O pattern changes from the second tier to the first tier.

12. The system of claim 9, wherein the processor is a tiering data relocator electrically coupled to the first and second tiers.

13. A computer program product comprising a computer readable storage medium having program instructions embodied therewith, wherein the computer readable storage medium is not a transitory signal per se, the program instructions readable and/or executable by a processor to cause the processor to perform a method comprising:
    detecting, by the processor, that a configuration change for a virtualization layer in a multi-tiered data storage system has been received;
    determining, by the processor, whether the configuration change corresponds to a tiering adjustment;
    in response to determining that the configuration change corresponds to a tiering adjustment, predicting, by the processor, input/output (I/O) pattern changes which will result from the configuration change;

determining, by the processor for each specific extent corresponding to the predicted I/O pattern changes, whether the specific extent is stored in a tier of the multi-tiered data storage system that is suitable to satisfy the predicted I/O pattern changes which correspond to the respective specific extent; and in response to determining that at least one of the specific extents is stored in a tier of the multi-tiered data storage system which is not suitable to satisfy the predicted I/O pattern changes which correspond to the at least one specific extent, migrating, by the processor, the at least one specific extent to another one of the tiers in the multi-tiered data storage system determined as being suitable to satisfy the predicted I/O pattern changes.

14. The computer program product of claim 13, wherein the I/O pattern changes are predicted before a first tiering cycle of the multi-tiered data storage system has completed.

15. The computer program product of claim 13, wherein the multi-tiered data storage system includes at least a first tier and a second tier, wherein the first tier includes one or more data storage devices which are suitable to satisfy read intensive I/O patterns, wherein the second tier includes one or more data storage devices which are suitable to satisfy write intensive I/O patterns.

16. The computer program product of claim 15, wherein migrating the at least one specific extent to another one of the tiers in the multi-tiered data storage system determined as being suitable to satisfy the predicted I/O pattern changes includes:

migrating specific extents which correspond to write intensive predicted I/O pattern changes from the first tier to the second tier, thereby increasing an effective lifespan of the data storage devices in the first tier.

17. The computer program product of claim 15, wherein migrating the at least one specific extent to another one of the tiers in the multi-tiered data storage system determined as being suitable to satisfy the predicted I/O pattern changes includes:

migrating specific extents which correspond to read intensive predicted I/O pattern changes from the second tier to the first tier.

18. The computer program product of claim 15, wherein the processor is a tiering data relocator electrically coupled to the first and second tiers.

19. The computer program product of claim 13, wherein determining whether the configuration change corresponds to a tiering adjustment includes:

determining whether the configuration change includes a volume expansion operation.

* * * * *